2 Sheets—Sheet 1.

W. H FOYE.
Combined Steam Harvester and Thrasher.

No. 220,366. Patented Oct. 7, 1879.

Witnesses
Geo. H. Strong.
Frank A. Brooks

Inventor
William H. Foye
By Dewey & Co Atty

2 Sheets—Sheet 2.

W. H. FOYE.
Combined Steam Harvester and Thrasher.

No. 220,366. Patented Oct. 7, 1879.

Witnesses
Geo. H. Strong.
Frank A. Brook.

Inventor
William H. Foye
By Dewey & Co. Attys

UNITED STATES PATENT OFFICE.

WILLIAM H. FOYE, OF SAN FRANCISCO, CALIFORNIA.

IMPROVEMENT IN COMBINED STEAM HARVESTER AND THRASHER.

Specification forming part of Letters Patent No. 220,366, dated October 7, 1879; application filed May 19, 1879.

*To all whom it may concern:*

Be it known that I, WILLIAM H. FOYE, of the city and county of San Francisco, and State of California, have invented a Steam-Harvester; and I hereby declare the following to be a full, clear, and exact description thereof.

My invention relates to an improved apparatus for harvesting grain; and it consists in a novel combination of a mechanism for cutting and heading the standing grain, suitable carrying and elevating belts, and a thrashing and cleaning mechanism, all mounted upon a frame-work having bearing-wheels, together with a novel steering device, and devices for raising and lowering the front and rear and the ends of the reaper. In combination with these devices I employ an engine to drive the sickle and thrasher, so that, while the machine is drawn over the field by horses, the reaper and thrasher are driven by this engine at any speed required, and independently of the movement of the machine over the ground. This enables me to cut thick or thin grain with equal facility, and relieves the team, as the tractional force necessary to drive the machinery is avoided.

Figure 1:
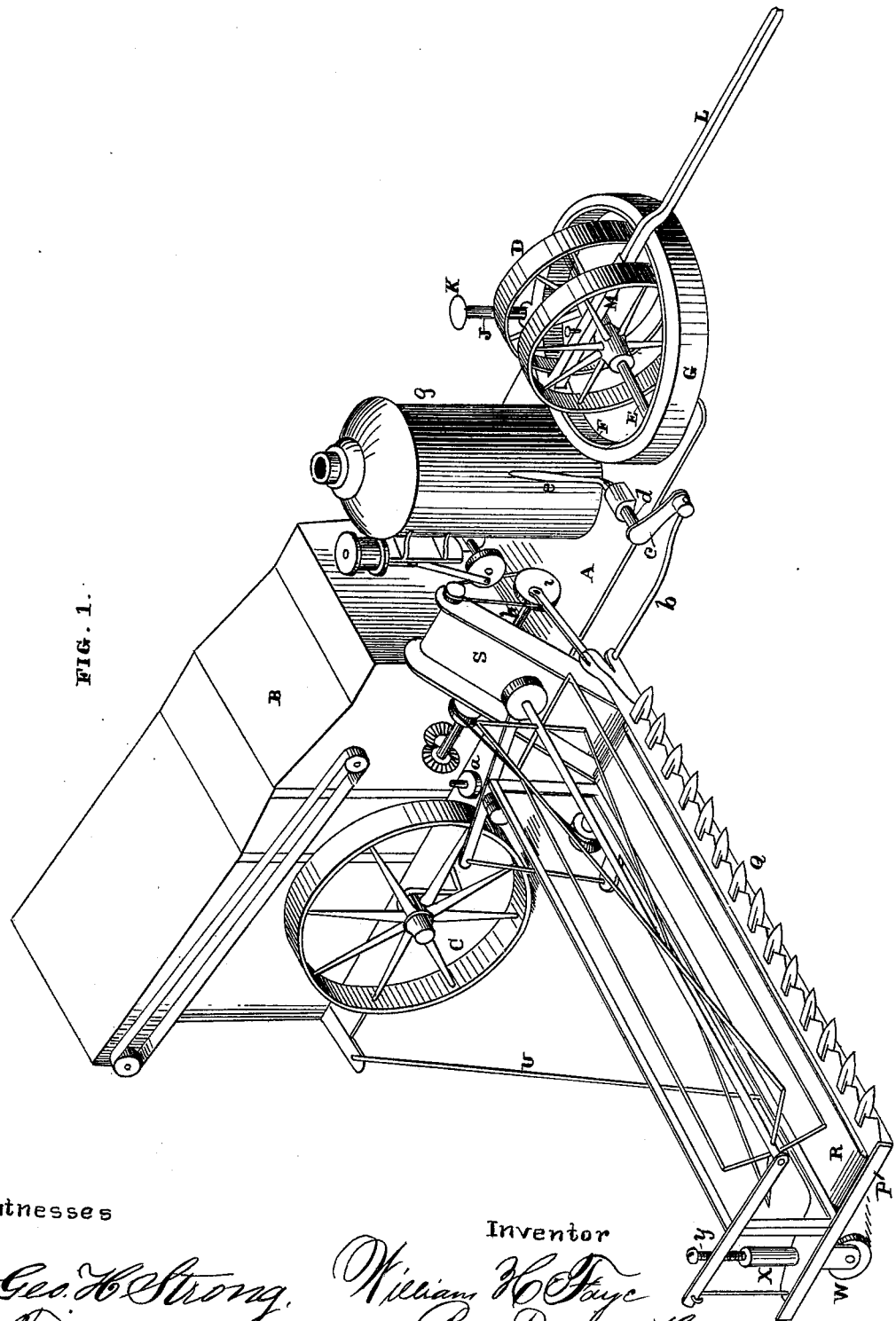
Figure 2:
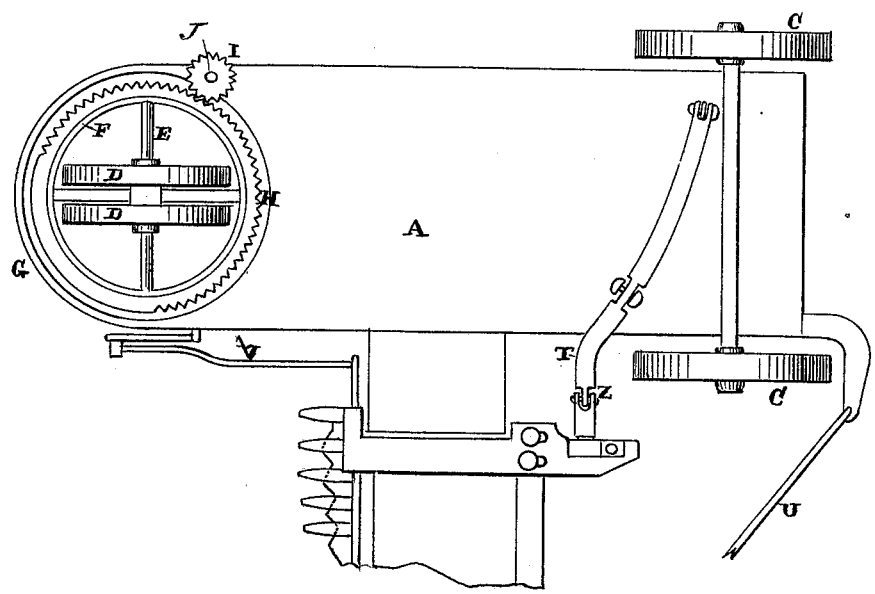
Figure 3:
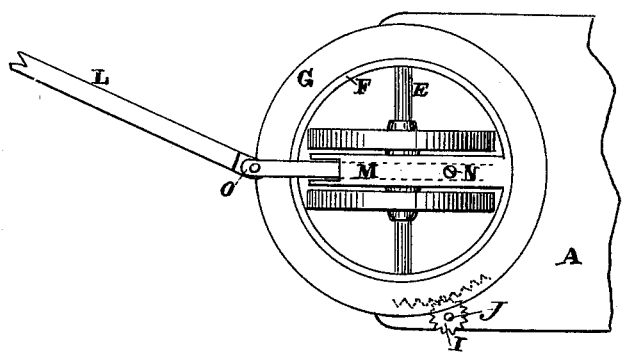

Referring to the accompanying drawings for a more complete explanation of my invention, Figure 1 is a perspective view of my apparatus. Fig. 2 is a bottom view. Fig. 3 shows the swiveled draft-pole.

A is a frame or bed, upon which the thrashing and cleaning apparatus B is mounted. C C are the rear bearing-wheels, which have a bent axle like a truck, so that the body and machinery may be set low for greater convenience and steadiness, and to reduce the amount of elevation necessary to bring the grain from the reaper to the thrasher.

The front end of the bed is supported upon a single wheel with broad tread, or, preferably, upon two wheels, D, which are placed near together upon a shaft or axle, E. This shaft has its ends supported in a circular hoop or rim, F, which turns in a circular-flanged case, G, secured to or formed as a part of the bed A. The outer edge of the hoop or rim beneath the flange of the case is provided with teeth H, and a pinion, I, from the exterior meshes with this gear, so as to turn it when desired.

This pinion has a shaft, J, which turns in boxes secured to the case G, as shown.

By means of a hand-wheel, K, the pinion may be turned in either direction, and by its action upon the rim F the guiding-wheels D will be turned independently of any action of the draft-animals. This is an important feature, as it enables me to work the machine close into the corners of a field, and to move straight up to any desired point after the team has commenced turning.

The pole L slides into a case, M, between the wheels D, and it is perforated, so that a pin, N, passing through a hole in the case, will enter either of the perforations desired, or other suitable devices may be employed whereby the pole may be lengthened or shortened at will.

The pole has a joint, O, formed at a point which, when the pole is drawn out, leaves it free from the case M, and this allows the draft-animals to turn to one side while the machine is held straight, so as to move forward by means of the gear and pinion, as before described.

When it is desired to have a rigid pole, it is simply necessary to push it back and secure it with the joint within the case, and it will be steadied and made rigid.

The reaper or header projects to one side at right angles with the body A, and consists of the bed P, having the sickle and bar Q at the front, the reel, the horizontal receiving and carrying belt R, and the elevating belt and spout S, these not differing materially from the usual construction. The header P is connected with the bed A by the adjusting-bar T at the rear, the diagonal brace U extending from the rear of the bed A to the rear of the header-bed and the front adjusting-bar, b, as shown. The outer end of the header is supported and raised or lowered by means of the wheel W. This wheel has a standard which moves up and down in a sleeve, X, and is fixed at any desired point by means of the adjusting-screw Y.

The bar T extends across beneath the bed A, and has one end hinged to a post at the side of the bed opposite from the header. The other end is suitably connected with the header. In the present case it has a journal turned upon it, and this journal turns in a box or sleeve, so that it will allow the header to move up and down without any twisting strain upon the bar. The bar is also made in two parts, hinged together at Z, for the same purpose. A screw or lever, a, or other suitable device, is connected with the bar T, being supported from or upon the bed A at the side nearest the header, and its action upon the bar T moves the latter up or down, and this motion enables me to make all the larger adjustments of the header. The minor adjustments are obtained by means of the arm or bar b, which extends from the front inner end of the header frame or bed to a crank-arm, c, passing through a pin on its outer end. This crank-arm is fixed to a short shaft, d, and a lever, e, attached to this shaft serves to operate the whole.

By this means the header is under complete control, and may be easily adjusted for any height of grain to be cut. The elevator S discharges the cut grain upon the feeding-platform or other device of the thrasher B.

The mechanism of the thrasher is not different from that usually employed in such machines, and I have, therefore, not particularly explained it.

Near the front of the bed A is placed the engine and boiler g, the engine shown in the present case being of the vertical inverted-cylinder pattern and connecting directly with the shaft h, which carries a pulley, i, by which the mechanism is driven.

By this means I am enabled to drive the mechanism independently of the motion of the apparatus over the ground, and I am thus enabled to keep the heading and thrashing machinery running at any speed desired, so that in heavy grain, where the team may move more slowly, the speed of the engine may be kept up, or even increased. It is especially valuable in turning corners, where the forward motion of the machine almost entirely ceases, so that the cutting and thrashing would be imperfectly done if the motion of the machine was depended upon to drive the header and thrasher.

Having thus described my invention, what I claim as new, and desire to secure by Letters Patent, is—

1. The described steam-harvester, consisting of a platform resting upon the bent axle of the rear supporting-wheels and suspended from the revolving ring of the forward supporting and guiding wheels, in combination with a cutting mechanism carried upon one side of the platform, a thrashing mechanism mounted upon the rear, and a boiler and engine upon the front of the said platform, the parts being adapted to co-operate, as and for the purpose set forth.

2. The combination of the platform A, with the cutting mechanism attached thereto in the manner described, and of the supporting and steering wheels with the flexible draft-connection, whereby the machine may be guided independently of the draft, as set forth.

3. The wheels D, having their axle supported in the horizontally-rotating rim or hoop F, and controlled by the pinion I, in combination with the pole L, having the joint O and fitted to move out or into the case M, substantially as and for the purpose herein described.

In witness whereof I have hereunto set my hand.

WILLIAM H. FOYE.

Witnesses:
  S. H. NOURSE,
  F. H. BROOKS.